United States Patent [19]

Romano

[11] 4,319,760
[45] Mar. 16, 1982

[54] OCCUPANT PROPELLED SKATEBOARD

[75] Inventor: Carmelo Romano, Lindenhurst, N.Y.

[73] Assignee: Joseph Azar, Woodmere, N.Y.

[21] Appl. No.: 134,793

[22] Filed: Mar. 28, 1980

[51] Int. Cl.³ .............................................. B62M 1/04
[52] U.S. Cl. ................................ 280/11.115; 280/243;
280/87.04 A
[58] Field of Search ........ 280/243, 251, 244, 87.04 A,
280/225, 246, 241, 11.115; 272/132, 133, 134

[56] References Cited

U.S. PATENT DOCUMENTS

| | | | |
|---|---|---|---|
| 519,384 | 5/1894 | Gatling | 280/241 X |
| 1,368,696 | 2/1921 | Butterfield | 280/243 |
| 1,459,573 | 6/1923 | Cleveland | 280/243 |
| 1,529,012 | 3/1925 | Crawford | 280/243 X |

Primary Examiner—Joseph F. Peters, Jr.
Assistant Examiner—Michael Mar

[57] ABSTRACT

A skateboard, having a platform and a pair of roller assemblies mounted respectively at opposed longitudinal ends of the platform. One of its roller assemblies has a rotatable axle and a pair of wheels fixedly secured thereto for conjoint rotation. A chain extends below the platform and is entrained upwardly through spaced holes for grasping by the user. A transmission is secured to the rotatable axle and is actuated by the movement of the chain to rotate the axle and thus propel the skateboard.

7 Claims, 3 Drawing Figures

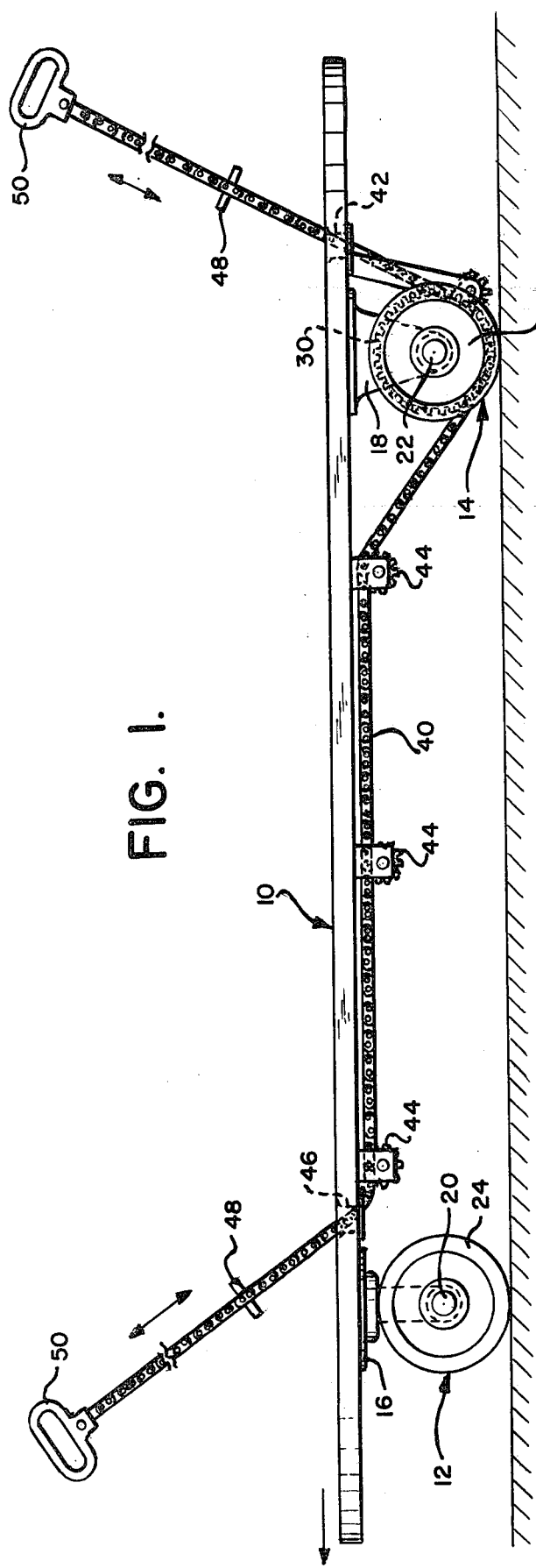
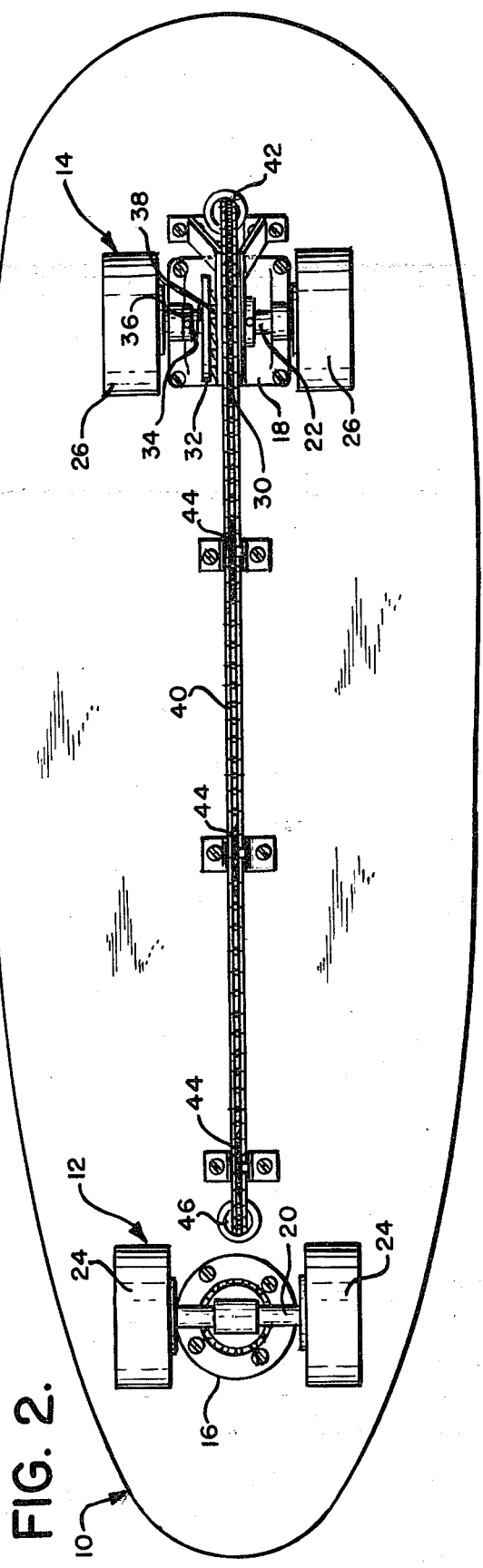

OCCUPANT PROPELLED SKATEBOARD

BACKGROUND OF THE INVENTION

The present invention relates generally to skateboards, and more particularly to a skateboard which can be propelled by hand manipulation, and through a mechanical gear transmission.

Skateboards have been well known for many years heretofore. In general, such devices comprise a rigid base board of about twice the size in width and length of an average foot, and upon which a person is capable of standing. The bottom of the board is provided with at least a pair of rollers, fore and aft, of the type conventionally used in roller skates. The person standing on the base board with one foot propels himself with the other.

One disadvantage of known skateboards is their limited ability to be propelled, since the person must exercise extreme skill in maintaining his balance, and in the fact that there is no mechanical advantage obtained by foot propulsion.

It is an object of this invention to provide a skateboard which can be driven by manual (re hand) manipulation, and which can be provided with mechanically greater power.

Other objects and advantages of the invention will become readily apparent to persons skilled in the art from the ensuing description.

SUMMARY OF THE INVENTION

In accordance with the present invention, there is provided a skateboard having a base platform upon which a pair of axles are respectively mounted rotatably adjacent opposed longitudinal ends. A pair of roller assemblies engageable with the surface upon which the skateboards are to be ridden are mounted at each of its longitudinal ends. One of said roller assemblies comprises a rotatable axle and a pair of wheels fixedly secured thereto for conjoint rotation. A chain extends below the platform and is entrained upwardly through spaced holes. The ends thereof may be grasped by the user of the skateboard. A transmission is secured to the rotatable axle and is actuated by the movement of the chain to rotate the axle and the associated wheels and thus propel said skateboard.

Preferably, the transmission comprises a freely rotatable sprocket wheel mounted on the axle and engageable by the chain. A drive wheel is secured to the axle for conjoint rotation therewith, and relative axial movement therealong. The sprocket and the drive wheel have cooperating uni-directional engagement, clutch means, and means for normally biasing the drive wheel into engagement with the sprocket wheel.

Full details of the present invention are set forth in the following description and in the accompanying drawings.

BRIEF DESCRIPTION OF THE DRAWINGS

In order that the invention may be more fully comprehended, it will now be described, by way of example, with reference to the accompanying drawings, in which:

FIG. 1 is a side elevational view of a skateboard which embodies the features of this invention;

FIG. 2 is a bottom plan view of the skateboard shown in FIG. 1; and

DESCRIPTION OF THE PREFERRED EMBODIMENT

Figure 3:
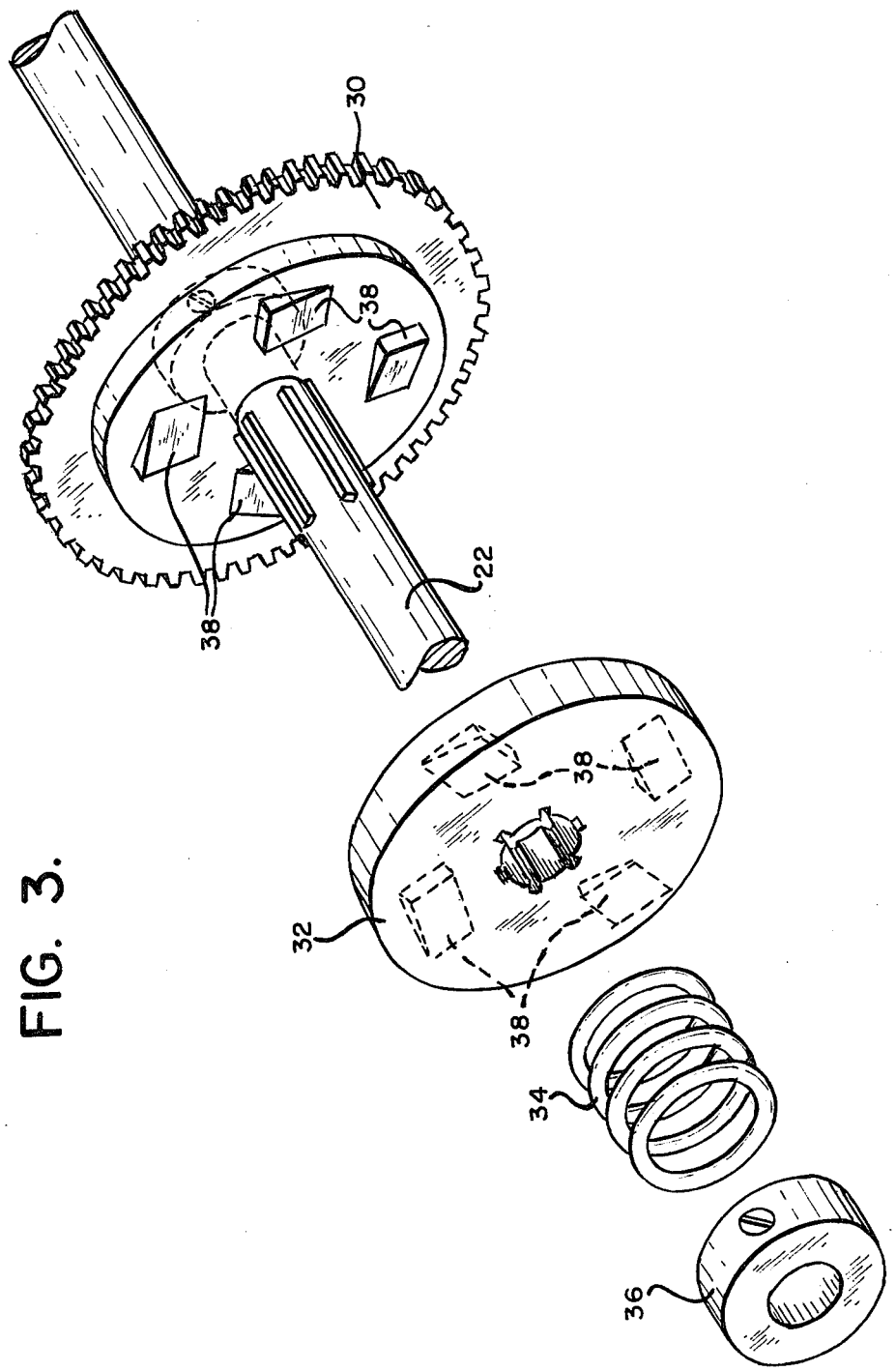
FIG. 3 is a perspective view of a sprocket wheel and its associated elements for propelling the skateboard.

Referring to FIG. 1 of the drawings, there is shown skateboard 10, consisting generally of a smooth upper platform. On the bottom surface of the board 10 are attached a pair of skate rollers generally indicated by the numerals 12 and 14.

Each of the skate roller assemblies comprises a supporting bracket 16 and 18, respectively, fastened by bolts or screws to the platform, an axle 20, 22, on which is mounted a pair of wheels 24, 26 respectively. The axles extend generally horizontally and are aligned behind each other along the central longitudinal axis of the board. The front axle 20 may be fixed by a rotatable ball bearing to be pivoted to swing about a vertical axis, so that the wheels at the front of the skateboard can be turnable to the right and left. The front wheels 24 themselves may be freely journalled on the associated axle 20 for rotation. On the other hand, the rear axle 22 is journalled in its supporting bracket for free rotation, but itself is not pivotable and its wheels 26 are fixedly secured to the axle.

Referring to FIG. 2, it will be seen that a sprocket wheel 30 is mounted upon rear axle 22, so as to be fixedly rotatable thereon. A drive wheel 32 is mounted fixedly upon the axle 22 for rotation together with it. To effect this, the drive wheel 32 is internally splined, whereas a portion of axle 22 is splined externally, the drive wheel thus being able to slide axially along axle 22 into position whereby it can engage the face of the sprocket wheel 30, or disengage therefrom. A helical compression spring 34 is mounted about the axle 22, abutting between a fixed stop collar 36 and the outward face of the drive wheel 32, and serves to releasably lock the drive wheel in driveable engagement with the sprocket wheel. The opposed faces of the sprocket wheel 30 and of the drive wheel 32 are provided with a plurality of spaced wedge-shaped dogs 38. The dogs have flat perpendicular faces opposed to each other and elongated, slanted backs, as a result of which the sprocket wheel and drive wheel will interengage when the sprocket wheel is rotated in a counter-clockwise direction, causing the axle 22 and attached wheels to be rotated correspondingly, thus propelling the board in the forward direction. On the other hand, rotation of the sprocket wheel in a clockwise direction causes the dogs to ride over each other. The combination of sprocket wheels and drive wheels produce a uni-directional slip clutch transmission. It will be obvious that other more complex transmissions for uni-directional and/or bi-directional propulsion can be employed.

To rotate the sprocket wheel, an elongated chain 40 is entrained beneath the platform, and around the sprocket wheel, from beneath. The rear end of the chain extends through a hole 42 in the board just to the rear of the rear roller assembly. The forward end of the chain extends over a pair of spurs 44 journalled on suitable brackets, centrally of the board, and extends upwardly through a hole 46 just to the rear of the forward roller assembly. A pair of enlarged stop members 48 are secured to the chain to prevent the chain from falling back through the holes 42 or 48. The stop members are spaced so as to permit the chain to be pulled forward and aft by a convenient amount corresponding to a reasonable stroke of pull by the person riding the board.

The stop members may be provided with removable fasteners, so that they can be adjusted along the length of the chain. Attached to each end of the chain is a handle 50, adapted to be grasped by the person using the skateboard.

It will thus be observed that the person using the board can easily propel himself without the use of his feet. His feet may both be placed on the board and all he has to do is balance himself thereon, and pull up and down with each hand on the respective ends of the chain. On one stroke, the sprocket wheel engages with and drives the drive wheel forwardly, on the other stroke, it slips. The board can be allowed to free wheel simply by holding the chain steady; allowing the sprocket wheel and drive wheel to move in opposite directions rotatably, since the drive wheel will have a fast forward rotation simply by the rotation of the back wheels.

A small retaining spur, is mounted below the chain in opposition to the sprocket wheel to ensure that the sprocket wheel always maintains engagement with the chain. Mechanical drive advantage is obtained by the use of a large sprocket wheel to permit lengthening drive for each stroke.

A more complex step-up gear transmission may be employed. Such gearing will be obvious to those skilled in this art. Even systems employing several axles and gears can be used, depending largely upon the expense to which one wishes to go in producing this device.

From the foregoing description, it will be seen that the skateboard of this invention is unique in that it can easily be driven by simply pulling one way or the other on the single chain.

Various embodiments, modifications and changes have been described. Other such variations will be obvious to those skilled in this art. Accordingly, it is intended that the foregoing disclosure be taken as illustrative and not as limiting of the invention.

What is claimed is:

1. A skateboard, comprising a platform forming an elongated foot support for a standing operator, a pair of roller assemblies mounted respectively at opposed longitudinal ends of said platform along the central axis of said platform, one of said roller assemblies comprising a rotatable axle and a pair of wheels fixedly secured thereto for conjoint rotation, an elongated chain extending below said platform and entrained upwardly through spaced holes arranged adjacent each roller assembly whereby the ends thereof may be grasped by separate hands of the user of the skateboard, and a transmission secured to said rotatable axle over which said chain is entrained, said transmission being actuated by movement of said chain to convert said movement into unidirectional rotation of said axle and said wheel and propel said skateboard.

2. The skateboard according to claim 1, wherein said transmission comprises a fixedly rotatable sprocket wheel mounted on said axle and engageably by said chain, a drive wheel secured to said axle for conjoint rotation therewith, and relative axial movement therealong, said sprocket and said drive wheel having cooperating uni-directional engagement, clutch means, and means for normally biasing said drive wheel into engagement with said sprocket wheel.

3. The skateboard according to claim 2, including a spur mounted in opposition to said sprocket wheel, and engaging said chain, said spur being spaced from said sprocket wheel a distance, retaining said chain thereon.

4. The skateboard according to claim 3, wherein said sprocket wheel is provided with a series of circumferentially spaced dog elements on one face thereof and said drive wheel is provided with a corresponding set of dog elements in opposition thereto.

5. The skateboard according to claim 1 including stop members secured to said chain above said platform to prevent said chain from falling through said holes.

6. The skateboard according to claim 4, wherein said stop members are secured by adjustable fastening means.

7. The skateboard as claimed in claim 1, wherein the other one of the roller assemblies comprises an axle having freely rotatably wheels, said axle being mounted to pivot about a vertical axis.

* * * * *